April 4, 1950    B. E. CARLSON    2,503,096
TRACTOR
Filed Sept. 28, 1946    2 Sheets-Sheet 1
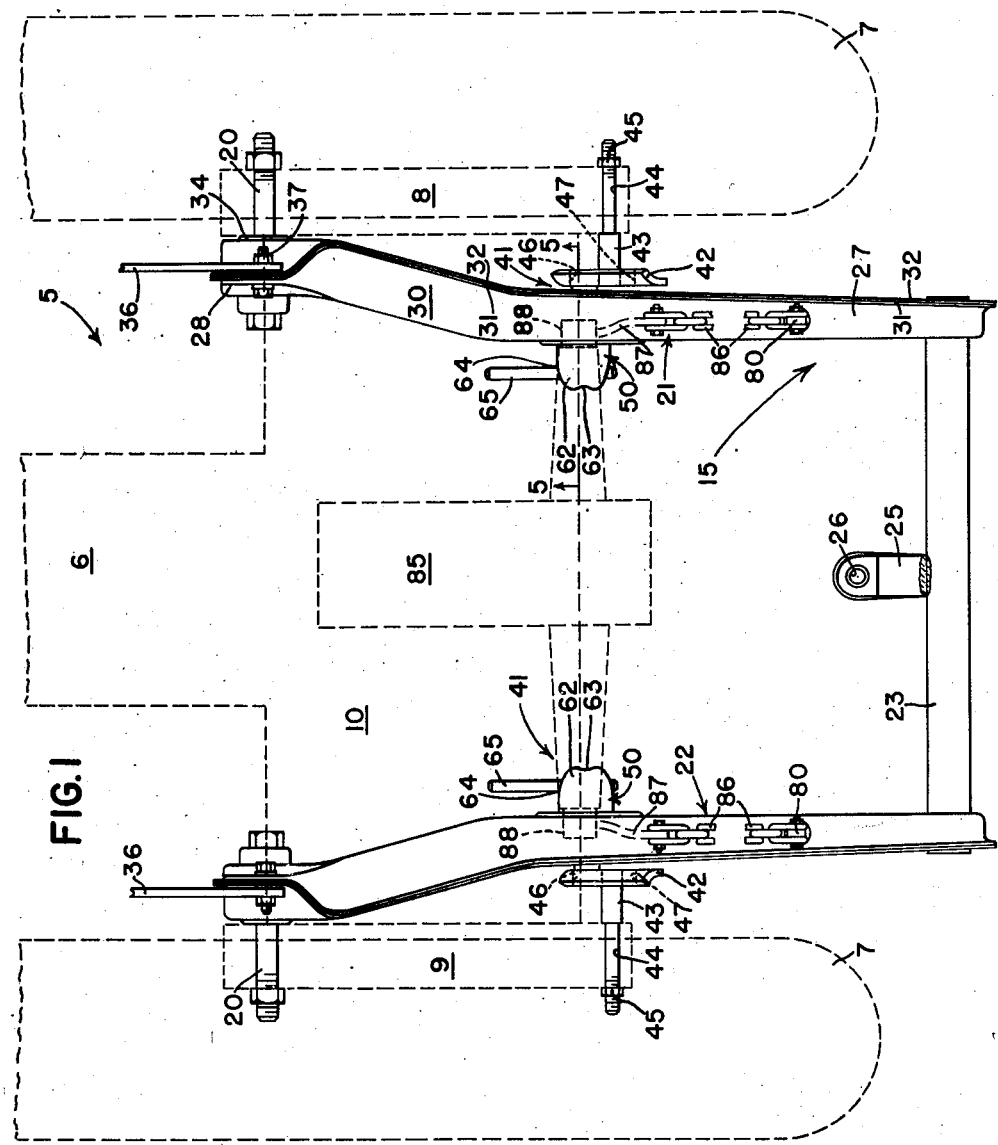
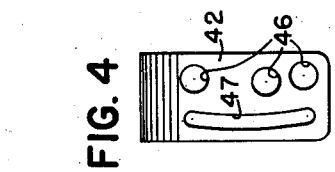
INVENTOR
B. E. Carlson
BY
ATTORNEYS April 4, 1950     B. E. CARLSON     2,503,096
TRACTOR Filed Sept. 28, 1946     2 Sheets-Sheet 2

Patented Apr. 4, 1950

2,503,096

UNITED STATES PATENT OFFICE 2,503,096

TRACTOR

Bernard E. Carlson, Moline, Ill., assignor to Deere Manufacturing Co., a corporation of Iowa Application September 28, 1946, Serial No. 700,055

11 Claims. (Cl. 280—33.44)

The present invention relates generally to draft devices and more particularly to a drawbar adapted to be mounted on a tractor and has for its principal object the provision of an adjustable drawbar which is lighter, but more resistant to bending than those heretofore known in the art.

Another object is to provide a novel holding mechanism for retaining said drawbar in different positions, selectively.

Another object is to provide a drawbar which is well adapted to be connected to the power lift mechanism of a tractor, so as to be raised and lowered by the power lift.

Still another object of the present invention is to provide a drawbar of novel design which is adapted to be connected to implements disposed ahead of the tractor or at the side of the tractor for operating the implements.

In attaining these objects, the present invention contemplates the use of a drawbar composed of a pair of pressed metal side members and a transverse bar connecting the side members, the latter being formed in the shape of bell cranks. Each of the side members is pivotally connected to the tractor by means of a pivot bolt located in each of the side members between the arms of the bell crank, one of the arms extending upwardly and having an opening therein for connecting the drawbar to an implement disposed to the side of the tractor or in front of the tractor. The other arm of the bell crank extends generally rearwardly to connect with the transverse arm. Implements disposed to the rear of the tractor are mounted on or connected to the transverse bar and may have a connection to the upwardly extending arm of the bell crank for resisting lateral thrust where necessary.

The rearwardly extending arms of the bell cranks are provided with brackets having openings adapted to receive connections from the rocker arms of the power lift mechanism for operating the drawbar by means of the power lift.

The holding mechanism comprises a spring actuated pin disposed in each of the side members in the rearwardly extending arm of the bell crank, the pin being urged by the spring to extend through the side member into openings disposed in a plate mounted on the final drive housings of the tractor. Thus the drawbar may be held rigidly in different positions by allowing the pin to engage different openings, thus permitting the power lift mechanism to be disconnected from the drawbar and put to other uses.

These and other objects and advantages of my invention will be apparent to those skilled in the art after a consideration of the following description taken in conjunction with the drawings appended hereto, in which Figure 1 is a plan view of a drawbar embodying the principles of the present invention showing its position relative to the rear portion of a tractor, the latter being indicated by dotted lines;

Figure 2 is a plan view of the drawbar by itself, portions of the drawbar being broken away to disclose details of construction;

Figure 3 is a sectional elevational view, taken substantially along the line 3—3 of Figure 2;

Figure 4 is a view of the face of the plates 42 showing the details thereof, taken substantially along the line 4—4 of Figure 1 and drawn to enlarge scale; and Figure 5 is an enlarged sectional elevational view taken along a line 5—5 in Figure 1.

Referring now to the drawings, the tractor, denoted in its entirety by the reference numeral 5, comprises a body 6 carried at its forward end on a pair of front wheels (not shown) and at its rear end on a pair of rear traction wheels 7 journalled on axles disposed in the lower portions of a pair of final drive housings 8, 9 depending from the outer ends of a rear axle housing 10. The wheels 7 are driven by the tractor engine (not shown) in a conventional manner. A drawbar 15 is mounted underneath the tractor frame at the forward end of the depending housings 8, 9 by means of coaxially disposed pivot bolts 20. The drawbar 15 is composed of a pair of side members 21, 22 and a transverse bar 23 connecting the two side members. A supporting bracket 25 is rigidly attached to the bar 23 by some means such as welding and has an opening 26 disposed therein for receiving a clevis to attach an implement thereto. Since the side members 21, 22 are similar in construction, only the member 21 will be described herein.

The side member 21 is formed in the shape of a bell crank having a rearwardly extending arm 27 and an upwardly extending arm 28, and comprises a pressed metal channel shaped body 30 having outwardly turned flanges 31 and a backing plate 32 welded to the flanges 31 to form a hollow structure.

Three horizontally disposed cylindrical bearing sleeves 33, 34, 35 pass through the side member 21 and are fastened therein by means which will be described later. The bearing sleeve 33 is disposed near the end of the upwardly extending arm 28 of the bell crank and is used for connection, as by a bolt 37 and a link 36, with an implement disposed to the front or to the side of the tractor. The bearing sleeve 34 is disposed between the arms of the bell crank and receives the pivot bolt 20 for fastening the drawbar 15 to the housing 8. The bearing sleeve 35 forms part of a holding device 41 which will now be described in detail.

The holding device 41 comprises a pair of plates 42 rigidly mounted on stems 43 fixed in recesses 44 in the housings 8 by means of nuts 45, and a pair of engaging mechanisms 50 positioned in the side members 21, 22 of the drawbar 15, respectively.

Referring now to Figures 1 and 4, the plates 42 are provided with a plurality of openings 46 disposed with their axes lying in arcs of circles having their centers at the axis of the pivot bolts 20, respectively. The plates 42 are also provided with slots 47 disposed radially outwardly from the openings 46 in arcs of circles coaxial with the circles previously described.

The engaging mechanism 50 comprises an engaging pin 51 which is adapted to slide axially in a cylindrical bearing sleeve 52 fastened in the backing plate 32 by a method to be described later, the pin 51 extending into the openings 46, selectively, to hold the drawbar 15 in different positions. The pin 51 extends through a cylindrical bearing sleeve 55 welded to the inner circumference of a supporting ring 56 of U-shaped cross section which is mounted on the metal body 30 by means of suitable conventional fastenings, such as rivets 57, the sleeve 55 being axially aligned with the sleeve 52 to give the effect of a single bearing sleeve. A spring 60 acts in compression against a collar 61 disposed about the pin 51 and fastened thereto, and reacts against the bearing sleeve 55 to urge the pin 51 to extend beyond the sleeve 52 into engagement with the openings 46, selectively. An annular seat 62 is welded to the outer circumference of the ring 56, the seat 62 having a serrated outer edge providing two sets of bearing surfaces 63, 64 displaced from each other along the axis of the pin 51. A rod 65 is adapted to pass through an opening 66 in the pin 51 to engage one or the other of the sets of bearing surfaces 63, 64, thereby holding the pin 51 in either engaged or disengaged position against the action of the spring. The rod 65 also serves as a handle to aid in positioning the pin 51. In order to fasten the bearing sleeves 33, 34, 35, 52 in the side members 21, holes are punched in the side members in the proper positions and the bearing sleeves are placed in the holes with ends projecting on either side. These ends are then upset to clamp the bearing sleeves in the side members to hold the former in place.

The operation of the holding device will now be described. To position the drawbar 15, the pin 51 in each side member 21 is forced inward against the action of the spring 60 by pulling on the handle rod 65. The pin is then rotated so that the rod 65 engages the set of bearing surfaces 63. This operation causes the end of the pin 51 to be disengaged from the openings 46. The drawbar is then raised or lowered about the axis of the pivot bolts 20 to the desired position and the pins 51 are rotated about their axes through ninety degrees, thus allowing the rod 65 to engage the bearing surfaces 64. Since the surfaces 64 are located nearer to the side members than the surfaces 63, the spring 60 operates to force the end of the pin 51 outward through the bearing sleeve 52 and into engagement with one of the openings 46 in the plate 42. Thus the drawbar may be held in different positions by allowing the pins 51 to engage different openings. A pair of bolts (not shown) may be passed through the bearing sleeves 35 and through the slots 47, and fastened in place by nuts to provide a more rigid connection for holding the drawbar against lateral displacement when necessary, for example, when a laterally vibrating implement such as a mower is to be mounted on the bar 23.

A pair of lifting brackets 80 are disposed in a pair of generally vertical bushings 81 passing through the rearwardly extending arms 27 of the bell cranks, respectively, the lifting brackets being held in place by a pair of nuts 82 and having openings 83 disposed therein to provide for connecting the drawbar 15 to the power lift mechanism 85 of the tractor by means of chains 86 connecting the brackets 80 with the arms 87 on the rockshaft 88 of the power lift mechanism 85.

In order to raise and lower the drawbar 15 by the power lift mechanism 85, the bolts are removed from the sleeves 35 and the rods 65 are rotated into engagement with the bearing surfaces 63 to hold the pins 51 out of engagement with the openings 46 and allow the drawbar to move with the rockable arms.

The present drawbar has many uses because it can either be held rigidly in place or can be connected so as to be operated by the power lift of the tractor. When it is fastened rigidly in place by the engaging mechanism 50 and by the bolts, the drawbar can be used with a mower adapted to be mounted directly thereon. When the drawbar is connected to the power lift of the tractor it can be used to operate cultivators mounted on the drawbar, to raise and lower the cultivators. Connection may be made by means of the hole 33 with implements disposed in front of or to the side of the tractor, for the purpose of controlling the implements. Thus it is evident that the present drawbar provides a very useful type of draft connection for mounting on a tractor.

I claim.

1. A drawbar comprising two side members and a transverse bar connecting said side members, each of said side members being composed of a pressed metal body and a backing plate rigidly fixed thereto, said side members being hollow, and said transverse bar extending at each end thereof through and secured to both the body and the backing plate of each side member, respectively, and being adapted for attaching an implement thereto.

2. A drawbar comprising two side members and a transverse bar connecting said side members, each of said side members being formed in the shape of a bell crank, one arm of said bell crank having a portion extending rearwardly to connect with said transverse bar and the other arm having a portion extending upwardly and having means for attachment to an implement, and pivot means on each side member intermediate the extending portions of the arms of the bell crank and aligned on an axis paralleling the transverse bar.

3. A drawbar comprising two side members and a transverse bar connecting said side members, each of said side members having the shape of a bell crank and being composed of a pressed metal body and a backing plate rigidly fixed thereto, said side members being hollow, and said transverse bar extending at each end thereof through and secured to both the body and the backing plate of each side member, respectively, and being adapted for attaching an implement thereto.

4. A side member for a drawbar, said side member being composed of a pressed metal channel shaped body and a backing plate rigidly fixed thereto to form a hollow structure having opposite walls, and a plurality of bearing sleeves disposed in said side member and passing through openings in a wall of said side member and having upset ends for clamping said bearing sleeves at opposite sides of the wall.

5. A drawbar comprising two side members and a transverse bar connecting said side members, each of said side members being formed in the shape of a bell crank, one arm of said bell crank having a portion extending rearwardly to connect with said transverse bar and the other arm having a portion extending upwardly and having means for being attached to an implement, each of said side members comprising a pressed metal channel shaped body and a backing plate rigidly fixed thereto to form a hollow structure, and pivot means on each side member intermediate the extending portions of the arms of the bell crank and aligned on an axis paralleling the transverse bar.

6. In combination with a tractor having rear axle housings and a pair of final drive housings depending from the outer ends thereof, a drawbar comprising two side members in the shape of bell cranks and a transverse bar connecting said side members, each of said side members being composed of a pressed metal body and a backing plate rigidly fixed thereto, said side members being hollow and being pivotally connected to said final drive housings, respectively, inwardly of the latter to provide for vertical swinging of said drawbar, each of said pivotal connections being positioned in its corresponding side member substantially between the arms of said bell crank.

7. In combination with a tractor having rear axle housings, and a pair of final drive housings depending from the outer ends thereof, a drawbar having side members pivotally connected to said final drive housings inwardly of the latter to provide for vertical swinging movement, and means for holding said drawbar in different positions, said means comprising plates attached to said final drive housings, respectively, and spring actuated pins disposed in said side members, respectively, said plates having a plurality of openings disposed therein adapted to receive the ends of said pins, said pins being urged into engagement with said openings by means of said springs to hold said drawbar in the desired position.

8. In combination with a tractor having a drawbar pivotally mounted thereon to provide for vertical swinging, means for holding said drawbar in different positions, selectively, said means comprising a plate adapted to be mounted on said tractor and having openings disposed therein and an engaging mechanism mounted on said drawbar in position to engage different ones of said openings, selectively, said mechanism comprising an engaging pin journaled in said drawbar to provide for axial movement of said pin, one end of said pin being adapted to extend beyond said drawbar to engage said openings, a spring acting against a collar disposed about said pin and against said drawbar to urge said pin into engagement with said openings, a seat mounted on said drawbar and disposed about said pin, said seat having two sets of bearing surfaces displaced one from the other along the axis of said pin, and a rod disposed in an opening passing through the other end of said pin at right angles to the axis of the latter, said rod being adapted to engage either of said bearing surfaces to hold said pin in or out of engagement, selectively, with said openings, said rod also acting as a handle to aid in disengaging said pin from said openings against the action of said spring.

9. The combination set forth in claim 8, with the further provision that said plate has a slot disposed therein in addition to said openings, and that a bolt is passed through said drawbar adjacent said engaging mechanism and slidably engaging said slot, said bolt being fastened in different positions, selectively, in said slot by means of a nut, in order to hold said drawbar more rigidly in the desired position.

10. The combination set forth in claim 8, with the further provision of means for attaching said drawbar to the power lift of said tractor in order to operate said drawbar by means of said power lift when said pin is held in disengaged position.

11. In a tractor having a transverse rear axle structure including laterally spaced portions thereon: a drawbar having laterally spaced side members and means for pivotally connecting said members respectively to said axle portions; and means for holding the drawbar in different angular positions of adjustment about said pivot means, including, for each side member and proximate axle portion, a plate element and a spring-loaded pin element, one element being on the side member and the other on the proximate axle portion, said plates having a plurality of openings disposed therein adapted to receive the ends of said pins, said pins being urged into engagement with said openings by means of said springs to hold said drawbar in the desired position.

BERNARD E. CARLSON.

REFERENCES CITED

The following references are of record in the file of this patent:

UNITED STATES PATENTS

| Number | Name | Date |
|---|---|---|
| 1,802,257 | Imhofe et al. | Apr. 21, 1931 |
| 2,033,813 | Broolhiet | Mar. 10, 1936 |
| 2,321,516 | Robertson | Jan. 8, 1943 |
| 2,341,807 | Olmstead et al. | Feb. 15, 1944 |